(No Model.)

W. A. McCOY.
WEED CUTTER.

No. 474,399. Patented May 10, 1892.

Witnesses.
A. Ruppert,
H. A. Daniels

Inventor.
Wm. A. McCoy
Per.
Thomas P. Simpson
Atty.

UNITED STATES PATENT OFFICE.

WILLIAM A. McCOY, OF BEMAN, KANSAS.

WEED-CUTTER.

SPECIFICATION forming part of Letters Patent No. 474,399, dated May 10, 1892.

Application filed July 29, 1891. Serial No. 401,051. (No model.)

*To all whom it may concern:*

Be it known that I, WILLIAM A. McCOY, a citizen of the United States, residing at Beman, in the county of Morris and State of Kansas, have invented certain new and useful Improvements in Weed-Cutters for Cultivators; and I do hereby declare the following to be a full, clear, and exact description of the invention, such as will enable others skilled in the art to which it appertains to make and use the same.

The special object of my invention is to make a weed-knife which may be conveniently attached to the beam of a cultivator with two bolts or clamps, which will not choke up with litter or trash, but allow it to pass off at either side, and which may be run very close to corn without cutting it or covering it up when small.

Figure 1:
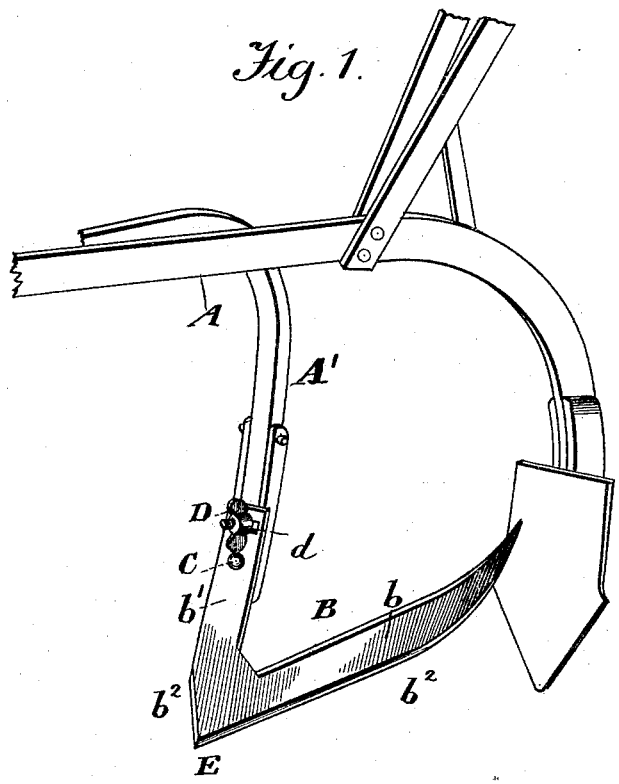
Figure 2:
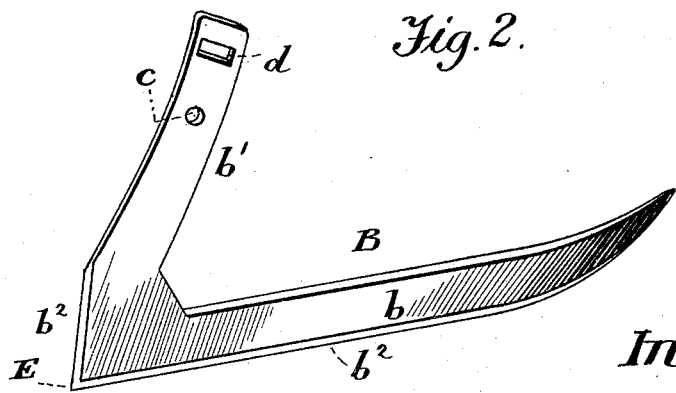

Figure 1 of the drawings is a perspective view showing a cultivator with my weed-cutter attached, and Fig. 2 a similar view of the weed-cutter detached.

In the drawings, A represents the beam of a cultivator, and A' a standard to which my weed-cutter B is attached by a pivot-bolt C, passing through the hole $c$, and by a clamp-screw D, working in the cross-slot $d$. By loosening the screw D the cutter B may be turned on the pivot C, so as to raise or lower the point E. With corn on listed ridges I may use two or four knives on the cultivator, made in pairs, right and left.

The knife B has the two cutting-edges $b^2\ b^2$ at an angle to each other, so as to divide the weeds and other vegetable matter which then passes to either side.

The knife B has a sweep $b$, shank $b'$, diamond-point E, and front cutting-edge $b^2$. The sweep $b$ is turned inwardly at the bottom from middle to end, where it becomes nearly or quite vertical. The diamond-point E runs under the weeds, cuts their roots, and raises them up. They then pass along the sweep until they are turned upside down, which prevents them from growing again.

On the first plowing two beams with my knife are used, while on the second plowing but one is employed and one shovel-plow to throw dirt to the corn.

Having thus described all that is necessary to a full understanding of my invention, what I claim as new, and desire to protect by Letters Patent, is—

A weed-knife B, having the sharpened edge $b^2$, the diamond-point E, the sweep $b$, turned inwardly at the bottom from about the middle to the end thereof, and the vertical shank $b'$, with the holes $c\ d$, substantially as shown and described.

In testimony whereof I affix my signature in presence of two witnesses.

WILLIAM A. McCOY.

Witnesses:
 JOHN G. BOND,
 A. H. SHARP.